United States Patent
Sklyarevich et al.

(10) Patent No.: US 9,505,654 B2
(45) Date of Patent: Nov. 29, 2016

(54) METHOD FOR THE CHEMICAL STRENGTHENING OF GLASS

(71) Applicant: Gyrotron Technology, Inc., Bensalem, PA (US)

(72) Inventors: Vladislav Sklyarevich, Bensalem, PA (US); Mykhaylo Shevelev, Bensalem, PA (US)

(73) Assignee: Gyrotron Technology, Inc., Bensalem, PA (US)

(*) Notice: Subject to any disclaimer, the term of this patent is extended or adjusted under 35 U.S.C. 154(b) by 34 days.

(21) Appl. No.: 14/248,975

(22) Filed: Apr. 9, 2014

(65) Prior Publication Data

US 2014/0360230 A1  Dec. 11, 2014

Related U.S. Application Data

(60) Provisional application No. 61/875,760, filed on Sep. 10, 2013, provisional application No. 61/831,837, filed on Jun. 6, 2013.

(51) Int. Cl.
*C03C 21/00* (2006.01)
*C03C 23/00* (2006.01)

(52) U.S. Cl.
CPC ......... *C03C 21/008* (2013.01); *C03C 23/0065* (2013.01)

(58) Field of Classification Search
None
See application file for complete search history.

(56) References Cited

U.S. PATENT DOCUMENTS

| | | |
|---|---|---|
| 3,486,995 A | 12/1969 | Evers |
| 3,728,095 A | 4/1973 | Grubb et al. |
| 3,951,634 A | 4/1976 | Hall et al. |
| 4,767,439 A | 8/1988 | Reunamaki |
| 4,816,055 A | 3/1989 | Reunamaki et al. |
| 4,872,896 A | 10/1989 | LaCourse et al. |
| 4,881,962 A | 11/1989 | Reunamaki et al. |
| 4,976,762 A | 12/1990 | Anttonen |
| 4,983,201 A | 1/1991 | Peltonen |
| 4,986,842 A | 1/1991 | Peltonen |
| 5,005,318 A | 4/1991 | Shafir |
| 5,022,908 A | 6/1991 | Honji et al. |
| 5,032,162 A | 7/1991 | Reunamaki |
| 5,057,137 A | 10/1991 | Reunamaki |
| 5,057,138 A | 10/1991 | Vehmas et al. |
| 5,066,320 A | 11/1991 | Lehto et al. |

(Continued)

FOREIGN PATENT DOCUMENTS

| JP | 06087663 A | * | 3/1994 |
|---|---|---|---|
| WO | 2013/107996 A1 | | 7/2013 |

OTHER PUBLICATIONS

Devlin, "Microwave Technology Heats Up the Glass Industry", Glass Magazine, Nov. 2004.*

(Continued)

*Primary Examiner* — Lisa Herring
(74) *Attorney, Agent, or Firm* — Sughrue Mion, PLLC

(57) ABSTRACT

A method for strengthening a glass article. The method includes exposing a selected area of the glass article to a beam of electromagnetic radiation in order to diffuse first alkali metal ions in the selected area out of the glass article and to diffuse second alkali metal ions on a surface of the glass article and in the selected area into the glass article. The second alkali metal ions are larger than the first alkali metal ions. The beam of electromagnetic radiation heats first alkali metal ions and the second alkali metal ions to a temperature that is greater than that of a glass network of the glass article.

16 Claims, 6 Drawing Sheets

(56) References Cited

U.S. PATENT DOCUMENTS

| | | | |
|---|---|---|---|
| 5,078,774 | A | 1/1992 | Vehmas et al. |
| 5,079,931 | A | 1/1992 | Lehto et al. |
| 5,352,263 | A | 10/1994 | Kuster et al. |
| 5,743,931 | A | 4/1998 | Flaugher et al. |
| 5,858,047 | A | 1/1999 | Frank et al. |
| 5,882,370 | A | 3/1999 | Garner et al. |
| 6,408,649 | B1 * | 6/2002 | Sklyarevich .......... C03B 29/025 264/432 |
| 2003/0233846 | A1 * | 12/2003 | Boaz .................... C03B 27/012 65/114 |
| 2009/0100872 | A1 | 4/2009 | Hawtof et al. |
| 2015/0044445 | A1 | 2/2015 | Garner et al. |

OTHER PUBLICATIONS

JP-06087663 Machine Translation Performed JPO website, Nov. 13, 2015.*
JP06-087663A English Translation performed by Phoenix Translations Nov. 2015.*
E.E. Shaisha and A. R. Cooper, "Ion Exchange of Soda-Lime Glass with Univalent Cations," Journal of the American Ceramic Society-Shaisha and Cooper vol. 64, No. 5, 1980, pp. 278-283.
International Search Report and Written Opinion dated Jul. 2, 2015 from the International Bureau in counterpart International Application No. PCT/US2015/024904.

* cited by examiner

Figure 1, a
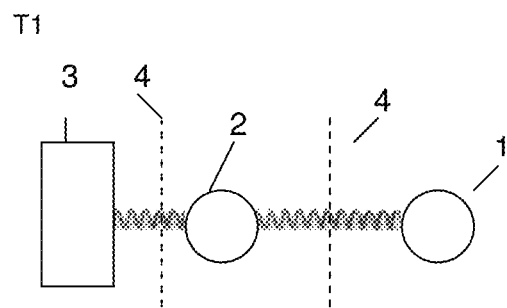
Figure 1, b
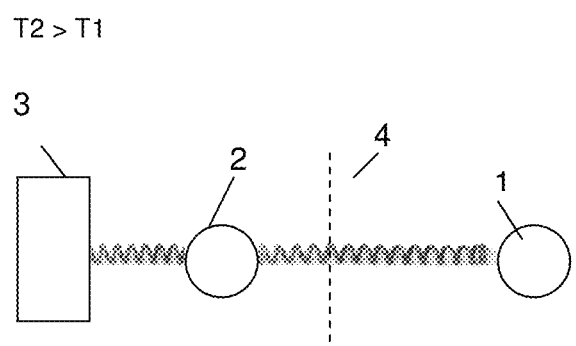
Figure 1, c
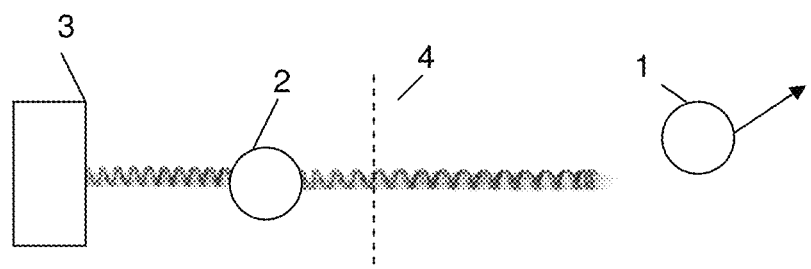

Figure 3, a
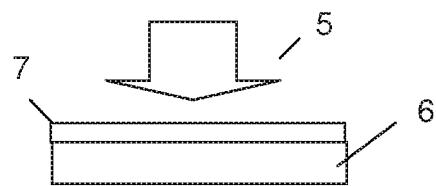
Figure 3, b
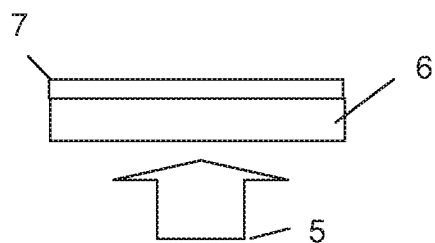
Figure 3, c
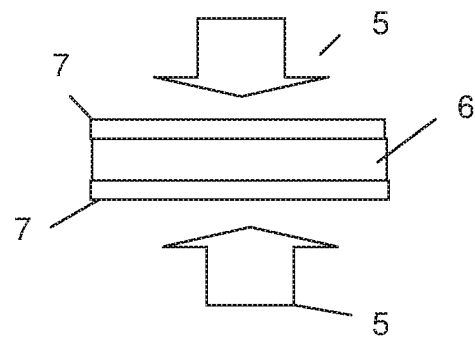

METHOD FOR THE CHEMICAL STRENGTHENING OF GLASS

CROSS-REFERENCE TO RELATED APPLICATIONS

This application claims the benefit of U.S. Provisional Patent Application No. 61/831,837 filed on Jun. 6, 2013, and U.S. Provisional Patent Application No. 61/875,760 filed on Sep. 10, 2013, the entire disclosures of which are hereby incorporated by reference.

TECHNICAL FIELD

Methods consistent with exemplary embodiments relate to a method of efficiently chemically strengthening glass, and more particularly, to a method of efficiently chemically strengthening glass that accelerates an ion exchange process.

BACKGROUND

Chemically strengthened glass is widely used for the production of electronic gadgets, displays, and the like. The total annual sale of thin strengthened glass is close to one billion dollars. Applying chemically strengthening glass to architectural and automotive glass will significantly increase this market.

The process of chemically strengthening glass is based on replacing smaller sodium ions inside of the glass with larger potassium ions. Because of size difference the compression stress is created. To facilitate the exchange of the sodium ions with the potassium ions, the glass is usually heated to the temperature below the strain point. The strain point is the point at which the particular glass has a dynamic viscosity of $10^{14.5}$ poises.

In general, hot salt baths are used to perform the ion exchange. To obtain a suitable depth of ion exchange, the process is on the order of hours, which very slow. This slow process is the primary reason why such large scale production of chemically strengthened architectural and automotive glass is expensive and has limited applications.

Also, architectural and automotive glass is usually soda lime glass. Soda lime glass is much cheaper than aluminosilicate glass. Aluminosilicate glass is usually used in the above-mentioned chemically strengthening processes. This is because, for soda lime glass, the energy activation of the potassium ion diffusion is much higher than in aluminosilicate glass and achieving any real necessary depths of ion exchange requires days of processing.

There are different methods for reducing the processing time of chemically strengthened class by modifying glass compositions and chemical strengthening salts. At best, these methods reduce the processing time down to the order of dozens of minutes or hours. In addition, these methods do not provide any substantial relief in the processing time for soda lime glass, which is cheaper than aluminosilicate glass.

U.S. Pat. No. 4,872,896 describes using a household microwave to reduce the total processing time for chemically strengthening a very small glass article.

Even if a reduction in the total processing time could have been achieved for some glass types using this method, no significant reduction in time can be achieved when soda lime glass is used. Also, such an approach cannot be used on an industrial scale for continuous in-line processing of large glass products, especially for chemically strengthening architectural and automotive products made from soda lime glass.

The present inventors are not aware of any method for reducing the processing time to chemically strengthen glass that does not require salt bathes and/or that is capable of being used for a large-scale continuous in-line processing as needed to meet the industry demand for chemically strengthened architectural and automotive glass.

Thus, there is a clear need in the art for a method that substantially reduces the time to perform an ion exchange process in a glass article on a large scale in a manner that is more effective with respect to processing time and expense.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to the present disclosure, a method is provided for the rapid strengthening an alkali metal glass article by exposing a selected area of the glass article to a beam of electromagnetic radiation. The beam of electromagnetic radiation diffuses first alkali metal ions in the selected area out of the glass article and diffuses second alkali metal ions on a surface of the glass article and in the selected area into the glass article. The second alkali metal ions are larger than the first alkali metal ions. The beam of electromagnetic radiation heats the first alkali metal ions and the second alkali metal ions to a temperature that is greater than that of a glass network of the glass article.

The frequency of the beam may be within a range of a resonate frequency of the first alkali metal ions and the second alkali metal ions in the glass network. The electromagnetic radiation power density may selected with a distribution having a uniformity that is greater than a predetermined threshold and great enough cause the diffusion of the second alkali metal ions and the first alkali metal ions without heating the glass article higher than a strain point of the glass article.

The solution that contains the source of the second alkali metal ions may be applied to the surface of the glass article and dried before exposing the glass article to the beam of electromagnetic radiation.

Further the beam of electromagnetic radiation may have a Gaussian power distribution of 99% or more. This provides the easiest way to control electromagnetic radiation distribution inside the glass article. The source of the electromagnetic radiation may be a gyrotron.

The electromagnetic radiation may irradiates the glass article through a source of the second alkali metal ions and into the glass article and/or through the glass article and into the source. The electromagnetic radiation may be pulsed or continuous. The selected area may be an entire surface of the glass article, every surface of the glass article, a specified area on a surface of the glass article (e.g., a line across the glass surface), etc.

Any type of glass and/or glass-like materials compositions which contain alkali metal ions such as sodium aluminosilicate glass, lithium aluminosilicate glass, soda lime glass, and like may be chemically strengthened according to the present disclosure. A glass article treated in accordance with the present disclosure may be used in the production of vehicle glazing such helicopters, planes, cars and the like, as well as for the production of architectural window glass, cover sheets, and/or touch screens for LCD and LED displays incorporated in mobile telephones, GPS devices, display devices such as televisions and computer monitors, and various other electronic devices.

The electromagnetic radiation may be microwave radiation in the frequency range 23.8 GHz-300 GHz. The electromagnetic radiation may be within a range of a resonate frequencies of the first alkali metal ions and the second alkali metal ions in the glass network to accelerate diffusion of the larger ions (e.g., potassium ion) into the glass article and reforming glassy network by direct affecting of the ions in the glass structure by electrical field. One or more exemplary embodiments of the present disclosure do not need additional equipment, of than the source of the beam of electromagnetic radiation, for heating the glass article.

According to the exemplary embodiments described herein, manufacturing costs can be reduced and the production rate of chemically strengthened glass can be increased. Specifically, the exemplary embodiments described herein permit a whole glass sheet to be chemically strengthened on the order of just seconds and on an industrial scale that is continuously-in-line. In addition, the cost and issues related to salt and salt baths can be eliminated while also increasing the quality of the chemically strengthened glass article.

BRIEF DESCRIPTION OF THE DRAWINGS

The above and/or other aspects will be more apparent by describing in detail exemplary embodiments, with reference to the accompanying drawings, in which:

FIGS. 1A-1C illustrate a related art diffusion process of heating in a salt bath;

FIGS. 3A-3C illustrate different options for glass processing;

DETAILED DESCRIPTION

Figure 2:
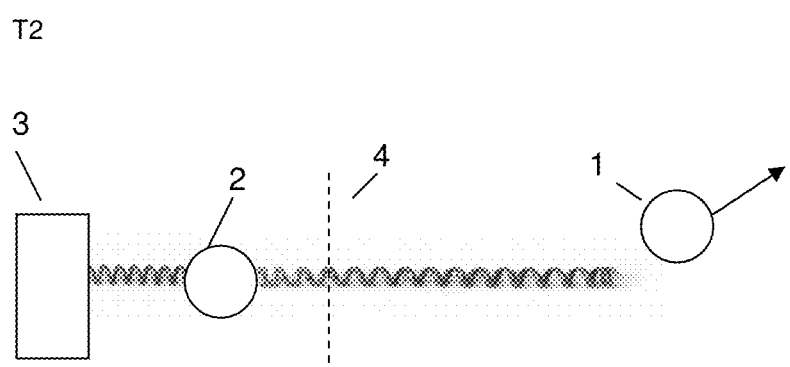
FIG. 2 illustrates diffusion process under electromagnetic radiation.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

The exemplary methods for chemically strengthening a glass article described herein are different from previous attempts to chemically strengthening glass using microwave radiation in that the exemplary methods described herein permit a glass article to be chemically strengthened on the order of just seconds and on an industrial scale that is continuously-in-line and cost effective. As detailed below, one or more exemplary methods of the present disclosure applies microwave radiation with i) a wavelength (frequency) that corresponds to the resonance frequency of the alkali ions in and on the glass article, ii) a power density that creates enough electrical field inside glass article to provide the ion exchange while simultaneously controlling the glass heating, and iii) an optimal monochromatic factor (that aggravates interaction of the microwave and alkali metal ions).

The present disclosure relates to a method for rapidly strengthening an alkali metal glass article in which alkali metal ions in the surface of the glass article are replaced by larger monovalent alkali metal ions by using an electromagnetic radiation.

Electromagnetic radiation with appropriate frequency and power density is used. According to the present disclosure, the wavelength (frequency) of the electromagnetic radiation, its spectrum, power density, and uniformity of the applied electromagnetic radiation are parameters which should be determined for each type and thickness of glass processed. These process parameters are chosen so as to achieve the desired surface compression in minimal time.

These parameters and how they are chosen are generally described below for an exemplary embodiment of the present disclosure in which a glass article with a preliminary applied source of monovalent alkali metal ions is exposed by microwave radiation.

The exemplary method described below is generally applicable to the treatment of any type of glass or glass-like material or any inorganic material having a surface that contains alkali metal ions. These treatments include but are not limited to glass sheets such as those employed in the production of windshields, side windows, and rear windows for vehicles such as automobiles and the like, in the production of architectural window glass and related materials, cover sheets and/or touch screens for LCD and LED displays incorporated in mobile telephones, GPS devices, display devices such as televisions and computer monitors, and various other electronic devices.

Frequency, spectrum, and power density of the incident electromagnetic radiation are described below.

The speed of the ion exchange process is determined by diffusion of larger monovalent alkali metal ions into that glass article and diffusion of smaller monovalent alkali metal ions toward outside of the glass article. As shown in FIGS. 1A-1C, alkali metal atoms 1, in the glass article are bonded mainly to oxygen atoms 2 in a short range order glassy network 3. This chemical bond has high extent of iconicity. The alkali metal atoms 1 can be considered as an ion (cation) and oxygen atoms 2 in this bond can be considered as an anion in the glassy network 3. The alkali metal ions 1 always oscillate due to the thermal motion around their equilibrium positions 4. FIGS. 1A-1C illustrate a related art method of heating a glass article in a salt bath to perform an ion exchange. As shown in FIGS. 1A and 1B, the average amplitude of the oscillations of the alkali metal ions 1 becomes higher as the glass temperature becomes higher in the salt bath, e.g., from temperature T1 to temperature T2. As shown in FIG. 1C, if the glass article is heated to an even higher temperature T3 in the salt bath, some alkali metal ions 1 break their bond with the oxygen atoms 2 and jump to another position in the glassy network 3. This creates diffusion movement of both small and large alkali metal ions that finally results in ion exchange. Increasing the glass temperature leads to accelerating of this process. However, there is a limit in the temperature increasing. If temperature becomes too high, the glassy network 3 rearranges thereby reducing the advantages of ion exchange process. This phenomenon is known as a stress relaxation.

The present inventors have discovered that the frequency, spectrum, and power density of the incident electromagnetic radiation are variables in the exemplary embodiments described herein. The correct selection of these parameters permits exclusive heating of the alkali metal ions 1 without overheating the glassy network 3. In other words, a proper selection of these parameters makes the alkali metal ions 1 more energetic without the stress relaxation risk that is inherent in the heated salt bath method described above.

When electromagnetic radiation is applied to the glass article it interacts with the glassy network 3 and some energy transfers from the electromagnetic radiation to the glass article. Two possible types of dielectric losses of the radiation occur in glasses: i) losses due to the movement of alkali ions 1 through the glassy network 3 (relaxation losses) and ii) losses related to the oscillation of these alkali ions 1 or units of ions within their positions (oscillation losses). Relaxation losses are related to dipole polarization and provide the general heating of the glass network, which accelerates the ion exchange process similar to conventional heating of a glass article.

Oscillation losses, on the other hand, are related to the vibration of glass network constituents around their equilibrium positions. The constituents each have their own resonate frequencies that depend on the mass, bond type and bond strength of the oscillators. In particular, as shown in FIG. 2, alkali metal ions 1 bonded to oxygen atoms 2 in the glassy network 3 have a particular set of resonate frequencies. If the electromagnetic radiation with a frequency close to one of these resonate frequencies is applied to the glass article, then resonance occurs. As shown in FIG. 2, this resonance leads to a strong energy transfer from the electromagnetic radiation to each alkali metal ion 1, which causes the local energy of the alkali metal ions 1 to increase exclusively. That is to say, the energy of the alkali metal ions 1 is greater than that of the surrounding glassy network 3. As shown in FIG. 2, because of this exclusive increase in energy, some alkali metal ions 1 break their bond with the oxygen atoms 2 even at a temperature T2, which is lower than the temperature T3 that is required to break the bond between the alkali metal ions 1 and the oxygen atoms 2 in the related art case shown in FIG. 1C. This means that the alkali metal ions can be heated to a higher temperature without the above-mentioned risk of stress relaxation. In another words, the diffusion accelerates due to more ions being involved in the ion exchange process.

Evaluations based on the molecular orbital theory show those resonate frequencies of alkali metal ions 1 range from 23.8 GHz to about 300 GHz. This, the exemplary methods described herein use a specialized generator, such as a gyrotron, to generate a beam of electromagnetic radiation that is in the above-mentioned range. The above-mentioned energy transfer can be strong only if the selected microwave frequency is monochromatic enough to provide a resonance condition for progressively increasing the energy of alkali metal ions 1 exclusive of the glassy network. The monochromatic factor of the electromagnetic radiation should be better than 1E-7. The particular frequency chosen should meet one of the resonate frequencies of alkali metal ions for each glass composition.

The optical properties of chemically strengthened glass depend on the uniformity of the created surface stress, which depends on the power distribution uniformity. In the exemplary embodiments of the present disclosure discussed above, the electromagnetic radiation preferably has a Gaussian power distribution of 99% or more. By using corresponding mirrors and scanning, this high uniformity provides a way to control the electromagnetic radiation distribution inside the glass article.

The particular chosen power density of the applied electromagnetic radiation should be high enough that the corresponding energy transfer is higher than loses of the above-mentioned resonance process. In addition, as the power density becomes higher, more alkali metal ions can break their bond with oxygen providing shorter time that is needed to achieve the necessary compression stress and case-depth. The power density should be at least 50 W/cm$^2$. However, this power density should be limited so as to not heat the glass article over its strain point.

In the exemplary embodiments of the present disclosure discussed above, the processing time can be further reduced by applying the electromagnetic radiation in a pulse mode. The maximum power density in the pulse can be increased to intensify and accelerate ion exchange process while the average power density that partially heats glassy network is kept in the minimal range.

The processing time can also be further reduced by applying cooling during the electromagnetic irradiation to cool down the glass being irradiated. This cooling may be provided by, for example, a fan, a jet of cooled air, a cooling source such as a heat exchanger near the glass, etc. By applying cooling to the area being irradiated, the low temperature of the glass article can be maintained even under a higher power density, which further accelerates ion exchange.

A generator, such as a gyrotron, can be used to generate electromagnetic radiation with the desired frequency, power density, monochromatic factor, and Gaussian power distribution.

A solution that contains a source of the second alkali metal ions (e.g., the larger alkali metal ions) can be applied to a surface of the glass article. Preferably, this solution is dried before exposing the glass article to the beam of electromagnetic radiation. The thickness of the dried layer should be less than the penetration depth of the electromagnetic radiation in this layer to provide the penetration of the electromagnetic radiation inside the glass surface/s but it contains enough material to form the necessary surface stress. Of course, the beam of electromagnetic radiation may penetrate through the glass article and towards the dried layer. In this case, the penetration depth of the electromagnetic radiation should be greater than the thickness of the glass article so as to permit the beam of electromagnetic radiation to penetrate through the glass article and into the dried layer of second alkali metal ions. The layer of second alkali metal ions can also be formed by dipping, sputtering, spraying, ion implantation, and similar processes.

In the exemplary embodiments of the present disclosure discussed above the electromagnetic radiation is applied from any side of the glass article or from both sides simultaneously or consecutively. For example, as shown in FIG. 3A, the electromagnetic radiation 5 irradiates the glass article 6 through a source of the second alkali metal ions 7 and into the glass article 6, through the glass article 6 and into the source of second alkali metal ions 7 as shown in FIG. 3B, or from both sides of the glass article 6 as shown in FIG. 3C.

The electromagnetic radiation may applied to a specified area of glass surface. The specified area may be an surface of the glass article, both surfaces of the glass article, the entire glass article, a portion of one of the surfaces of the glass article, etc. For example, the specified area may be a line on the glass surface (not shown). In the case of the selected area being a line, the electromagnetic radiation may be used to de-strengthen the glass article (e.g., replace the larger alkali ions in the glass article with smaller alkali ions on the glass articles) to permit the glass article to be cut more easily. In such a case, the electromagnetic radiation may be used to re-strengthen the glass article (e.g., replace the smaller ions in glass article with larger ions on the glass article) after the cutting.

The exemplary embodiments described herein are applicable to the treatment of any type of glass such as sodium silicate glass, lithium silicate glass, soda lime glass, and others types of glass that contain alkali metal ions. The source of larger monovalent alkali metal ions should be in direct contact with glass surface and is selected from among, alkali metal chlorides, nitrates, phosphates, and like.

[Electromagnetic Irradiation Set-Up]

Figure 4:
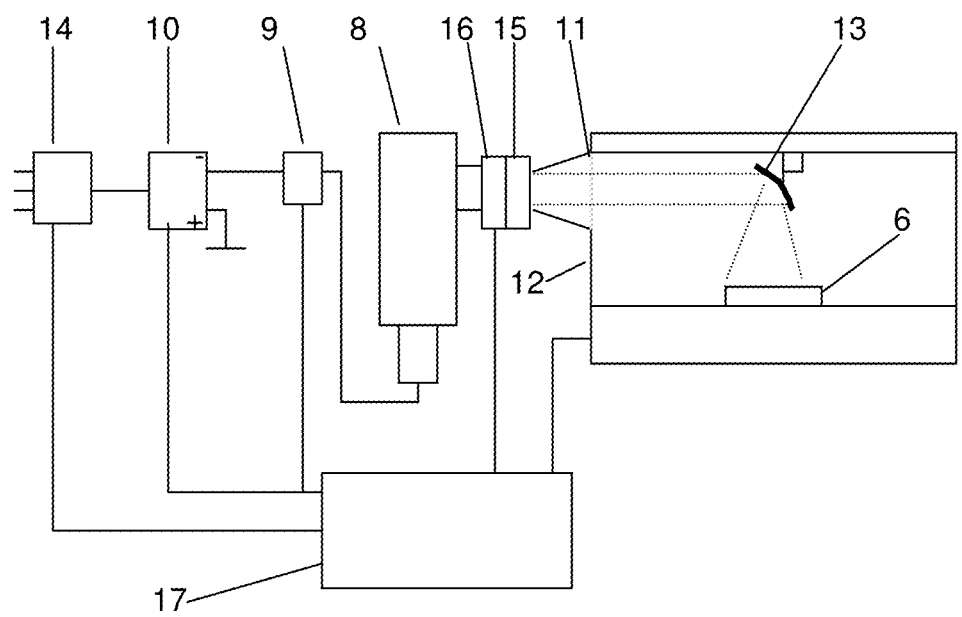
FIG. 4 illustrates an example of the radiation set up.

Electromagnetic radiation with the necessary frequency, power density, monochromatic factor, and Gaussian power distribution can be achieved using a generator such as a gyrotron. FIG. 4 shows an example of an electromagnetic radiation installation that can be used to perform the exemplary embodiments of the present disclosure.

The radiation unit includes of a gyrotron 8 that operates at a proper frequency and has a proper output continuous wave (CW) power. The gyrotron 8 is connected to a filament transformer 9 and a power supply 10. The electromagnetic beam (EB) passes through a waveguide 11 into a chamber 12 where it is directed with a mirror 13 to a selected area of the glass 6. The chamber 12 may also include fixtures, reflectors and the like necessary to each particular embodiment of the disclosure which are not illustrated in FIG. 4. The mirror 13 ensures uniform distribution of microwave power over the selected area.

The power of the electromagnetic radiation is adjusted by a power regulator/switcher 14 and measured by a colorimeter 15 which is installed in a gyrotron output window 16. The power and all other parameters of the gyrotron are monitored by a computerized control panel 17. The installation may optionally include elements necessary to cool the samples, pyrometer Minolta/Land Cyclops 300/AF, and other equipment.

It is understood that the particular installation illustrated in FIG. 4 is optimally designed for research and development or demonstration testing of the exemplary embodiments described herein. A person of ordinary skill in the art that has read and understood the present disclosure can easily modify the installation for manufacturing processes of various scales.

EXAMPLES

The following examples are presented to provide a more detailed explanation of the present disclosure and of the preferred embodiments thereof and are intended as illustrations and not limitations.

Example 1

Processing Sodium Aluminosilicate Glass

1. A 50 mm by 50 mm, 1 mm thick sodium aluminosilicate glass plate was chosen for the ion exchange processing. In this processing, sodium (small alkali metal ions) was exchanged with potassium (large alkali metal ions). One of the resonate frequencies of sodium and potassium ions in the glass was found to be around 58 GHz. Potassium Nitrate (KNO3) was chosen as the source of potassium ions. Potassium nitrate has melting temperature 334° C. Melted potassium nitrate has a penetration depth of about 0.2 mm for a microwave beam with selected frequency of around 58 GHz.

2. A water solution of potassium nitrate was made (15 g of potassium nitrate per 100 ml of water). The glass plate was immersed in this solution so the top glass surface was 1 mm deep under the solution surface. The glass plate was removed and completely dried. Drying off the water solution forms a thin layer of potassium nitrate on the glass surface. This layer was less than 0.15 mm thick which is less than the penetration depth for electromagnetic radiation with a frequency around 58 GHz.

3. A 60 GHz gyrotron was set up to generate an electromagnetic beam having a spectrum ±5 kHz and over 99% Gaussian distribution. The apparatus shown in FIG. 4 was used to provide a beam of electromagnetic radiation with a diameter of 80 mm and uniformity better than 1% onto the glass. The power density was up to 100 W/cm$^2$. The glass article with the applied potassium nitrate layer was placed in the processing area, which was equipped with a temperature sensor. The gyrotron power was turned on and, by controlling the gyrotron power, the temperature of the glass was kept around 400° C. was during the processing. The processing time was 30 seconds. After processing and cooling the glass article (e.g., a glass plate) was removed from the processing area. All remains of potassium nitrate were carefully washed out from the processed glass plate.

Figure 5:
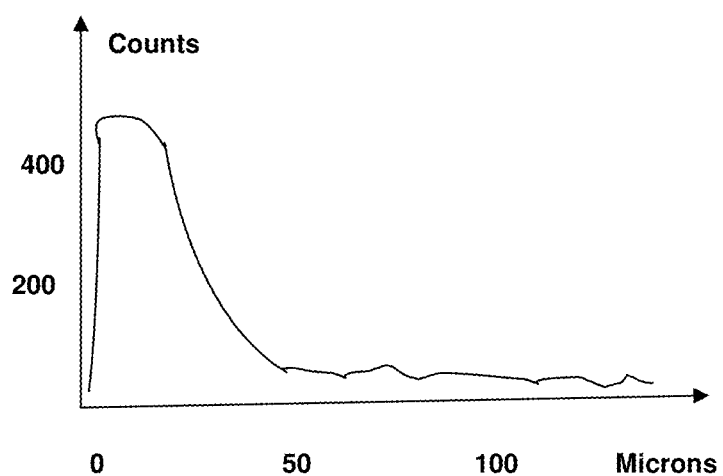
FIG. 5 graphically shows the potassium distribution after processing a sodium aluminosilicate glass sample using the exemplary methods.

4. The processed glass article was tested for the depth of formed potassium layer into the processed glass surface. Testing was performed by Vartest Laboratory (NY) using Scanning Electron Microscope with standard Energy Dispersive X-Ray technique in high vacuum mode with accelerated voltage 20 kV. As shown in FIG. 5, the potassium was present in a significant concentration until about 30 microns into the glass.

Example 2

Processing Soda-Lime Glass

1. A 50 mm by 25 mm, 1 mm thick soda-lime (Corning® 0215) glass plate was chosen for the ion exchange processing. In this test, sodium (small alkali metal ions) was exchanged by potassium (large alkali metal ions). One of the resonate frequencies of sodium and potassium ions in the glass was found to be around 80 GHz. Potassium Nitrate (KNO3) was chosen as the source of potassium ions. Potassium nitrate has melting temperature 334° C. Melted potassium nitrate has penetration depth of about 0.2 mm for the microwave with selected frequency of about 80 GHz.

2. A water solution of potassium nitrate was made (15 g of potassium nitrate per 100 ml of water). The glass article (e.g., a glass plate) was immersed in this solution so the top glass surface was 1 mm deep under the solution surface. The glass plate was removed and completely dried. A Drying off the water solution forms a thin layer of potassium nitrate on the glass surface. This layer was less than 0.1 mm thick which is less than microwave penetration depth.

3. A 82.6 GHz gyrotron was set up to generate electromagnetic beam a spectrum ±5 kHz and over 99% Gaussian distribution. The apparatus shown in FIG. 4 was used to provide a beam of electromagnetic radiation with a frequency of 82.6 GHz, a uniformity better than 1%, and a diameter of 60 mm. The power density was up to 60 W/cm$^2$. The glass article with the potassium nitrate layer formed thereon was placed in the processing area, which was equipped with a temperature sensor. The gyrotron power was turned on and, by controlling the gyrotron power, the temperature of the glass was kept around 400° C. was during the processing. The processing time was 100 seconds. After processing and cooling, the glass article was removed from the processing area. All remains of potassium nitrate were carefully washed out from the processed glass plate.

Figure 6:
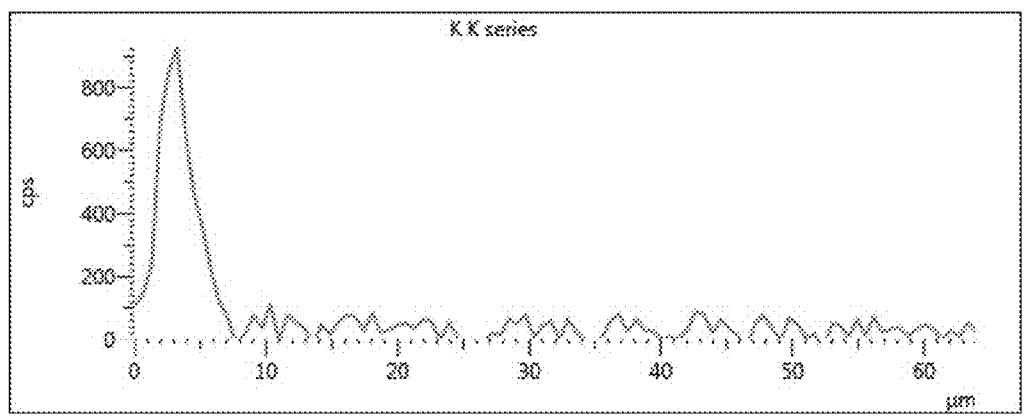
FIG. 6 graphically shows the potassium distribution after processing a soda lime glass sample using the exemplary methods.

4. The processed glass plate was tested to characterize Potassium enrichment in the sample sub-surface, via cross-sectional Scanning Electron Microscope/Energy Dispersive X-Ray. Testing was performed in high vacuum mode at 20 kV and 0.6 nA with a 100 micron aperture to maximize counts for EDS analysis. As shown in FIG. 6, Enrichment of Potassium was detected in the top 7 microns of the glass surface when analyzed in this cross-section.

The foregoing exemplary embodiments and advantages are merely exemplary and are not to be construed as limiting the present inventive concept. The description of the exemplary embodiments is intended to be illustrative, and not to limit the scope of the claims, and many alternatives, modifications, and variations will be apparent to those skilled in the art.

What is claimed is:

1. A method for strengthening a glass article, the method comprising:
    exposing a selected area of the glass article to a beam of electromagnetic radiation in order to diffuse first alkali metal ions in the selected area out of the glass article and to diffuse second alkali metal ions on a surface of the glass article and in the selected area into the glass article, the second alkali metal ions being larger than the first alkali metal ions, wherein
    the beam of electromagnetic radiation heats first alkali metal ions and the second alkali metal ions to a temperature that is greater than that of a glass network of the glass article, and
    cooling the selected area during the exposing of the selected area of the glass article to the beam of electromagnetic radiation.

2. The method of strengthening a glass article according to claim 1, wherein the beam of electromagnetic radiation includes:
    a frequency that is within a range of a resonate frequency of the first alkali metal ions and the second alkali metal ions in the glass network; and
    a power density that is great enough cause the diffusion of the second alkali metal ions and the first alkali metal ions without heating the glass article higher than a strain point of the glass article.

3. The method for strengthening the glass article according to claim 1, further comprising melting a source of the second alkali metal ions during the exposure of the glass article to the beam of electromagnetic radiation.

4. The method for strengthening the glass article according to claim 3, further comprising:
    applying the source of the second alkali metal ions onto the surface of the glass article; and
    drying the glass article before exposing the glass article to the beam of electromagnetic radiation.

5. The method for strengthening a glass article according to claim 1, wherein the beam of electromagnetic radiation has a Gaussian power distribution of 99% or more.

6. The method for strengthening a glass article according to claim 5, further comprising using a gyrotron to project the beam of electromagnetic radiation.

7. The method for strengthening a glass article according to claim 1, further comprising using a gyrotron to project the beam of electromagnetic radiation.

8. The method for strengthening a glass article according to claim 1, wherein exposing the glass article to the beam of electromagnetic radiation includes projecting the beam of electromagnetic radiation through a source of the second alkali metal ions and into the glass article.

9. The method for strengthening a glass article according to claim 1, wherein exposing the glass article to the beam of electromagnetic radiation includes projecting the beam of electromagnetic radiation through the glass article and into a source of the second alkali metal ions.

10. The method for strengthening a glass article according to claim 1, wherein exposing the glass article to the beam of electromagnetic radiation includes pulsing the beam of electromagnetic radiation.

11. The method for strengthening a glass article according to claim 1, wherein the glass article is selected from among sodium aluminosilicate glass, lithium aluminosilicate glass, and soda lime glass.

12. The method for strengthening a glass article according to claim 1, wherein the selected area of the glass article is an entire surface of the glass article.

13. The method for strengthening a glass article according to claim 1, wherein the selected area is less than an entire surface of the glass article.

14. The method for strengthening a glass article according to claim 1, wherein characteristics of the electromagnetic beam permit the first alkali metal ions and the second alkali metal ions to be heated without heating the glass article to a temperature that is greater than a strain point of the glass article.

15. The method for strengthening a glass article according to claim 1, wherein the frequency of the beam of electromagnetic radiation is selected from a range of 23.8 GHz to 300 GHz.

16. The method for strengthening a glass article according to claim 1, further comprising re-exposing the selected area to the beam of the electromagnetic radiation.

* * * * *